(12) United States Patent
Langkabel et al.

(10) Patent No.: US 8,950,918 B2
(45) Date of Patent: Feb. 10, 2015

(54) VEHICLE LAMP WITH LIGHT-EMITTING DIODE AS LIGHT SOURCE

(71) Applicant: GM Global Technology Operations LLC, Detroit, MI (US)

(72) Inventors: Frank Langkabel, Ruesselsheim (DE); Carina Scheider, Ginsheim-Gustavsburg (DE); Patrick Arkenbosch, Hofheim am Taunus (NL); Steve Kozma, Wiesbaden (DE); Ingolf Schneider, Ruesselsheim (DE); Ullrich Hochmuth, Bischofsheim (DE)

(73) Assignee: GM Global Technology Operations LLC, Detroit, MI (US)

(*) Notice: Subject to any disclaimer, the term of this patent is extended or adjusted under 35 U.S.C. 154(b) by 134 days.

(21) Appl. No.: 13/671,795

(22) Filed: Nov. 8, 2012

(65) Prior Publication Data

US 2013/0121011 A1    May 16, 2013

(30) Foreign Application Priority Data

Nov. 11, 2011  (DE) .......................... 10 2011 118 330

(51) Int. Cl.
 *B60Q 1/00*   (2006.01)
 *B60Q 1/04*   (2006.01)
 *F21V 29/00*  (2006.01)
 *F21S 8/10*   (2006.01)

(52) U.S. Cl.
 CPC . *B60Q 1/04* (2013.01); *F21V 29/22* (2013.01); *F21S 48/328* (2013.01); *F21S 48/1154* (2013.01); *F21S 48/1159* (2013.01); *F21S 48/1208* (2013.01); *F21S 48/155* (2013.01); *B60Q 1/0052* (2013.01)
 USPC ............ 362/547; 362/545; 362/294; 362/373

(58) Field of Classification Search
 USPC .................................. 362/545, 547, 294, 373
 See application file for complete search history.

(56) References Cited

U.S. PATENT DOCUMENTS

| | | | |
|---|---|---|---|
| 7,806,562 B2 | 10/2010 | Behr et al. | |
| 2008/0130308 A1* | 6/2008 | Behr et al. | 362/507 |
| 2009/0296416 A1* | 12/2009 | Luo et al. | 362/487 |

FOREIGN PATENT DOCUMENTS

| | | |
|---|---|---|
| DE | 102006059904 A1 | 6/2008 |
| DE | 102008061526 A1 | 6/2010 |
| EP | 2149748 A1 | 2/2010 |

OTHER PUBLICATIONS

German Patent Office, German Search Report for Application No. 102011118330.6, dated Jul. 2, 2012.

* cited by examiner

*Primary Examiner* — Sean Gramling
(74) *Attorney, Agent, or Firm* — Ingrassia Fisher & Lorenz, P.C.

(57) ABSTRACT

A vehicle lamp having a housing and an illumination unit arranged within the housing is provided. The illumination unit comprises at least one light-emitting diode as light source. The at least one light-emitting diode is thermally coupled to a cooling element. The cooling element has a surface region arranged within the housing. On the surface region a decorative element is arranged.

20 Claims, 5 Drawing Sheets

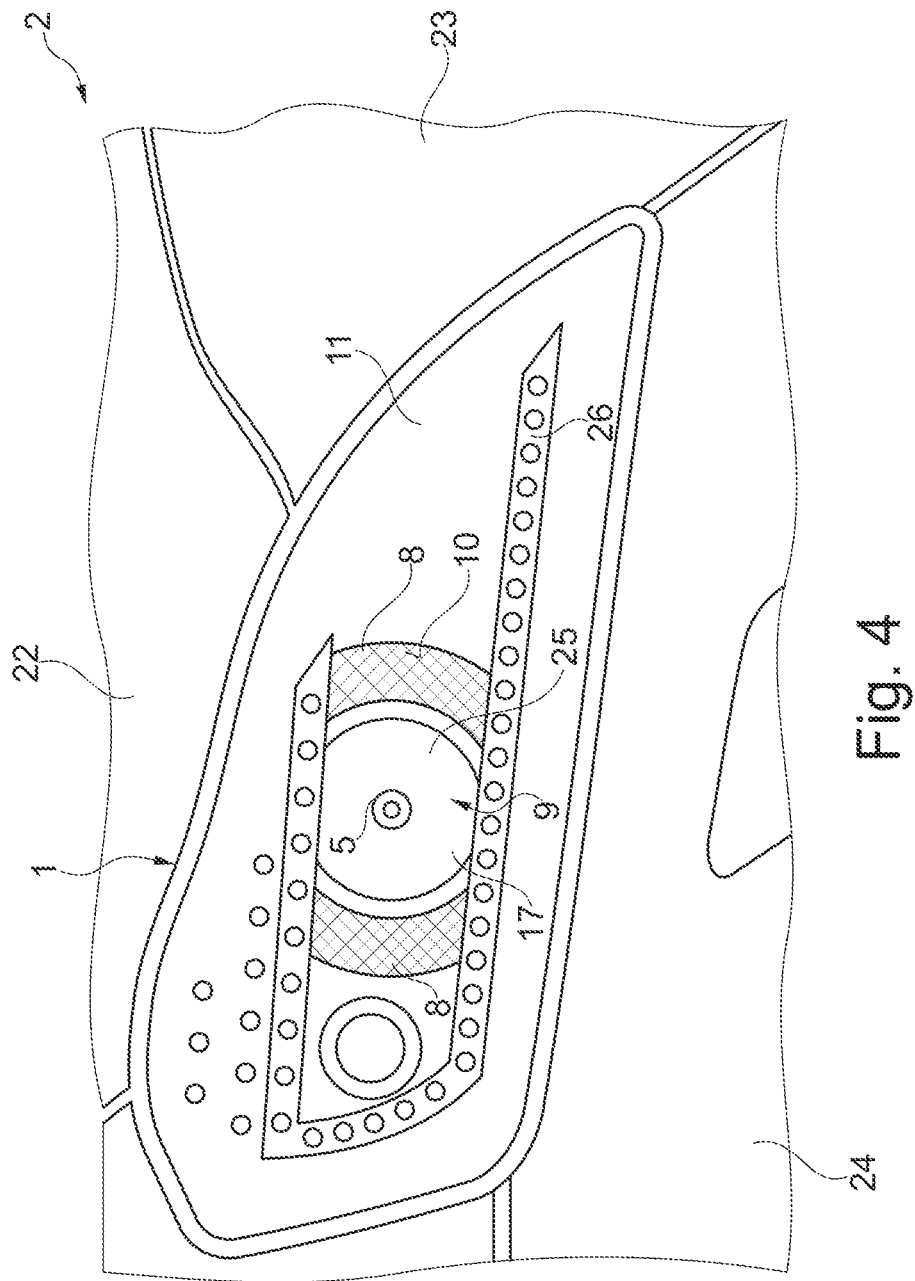

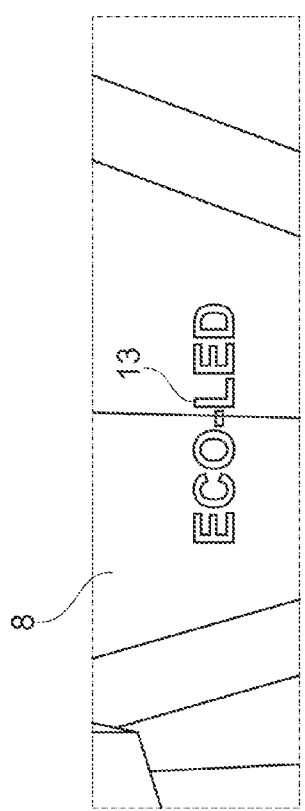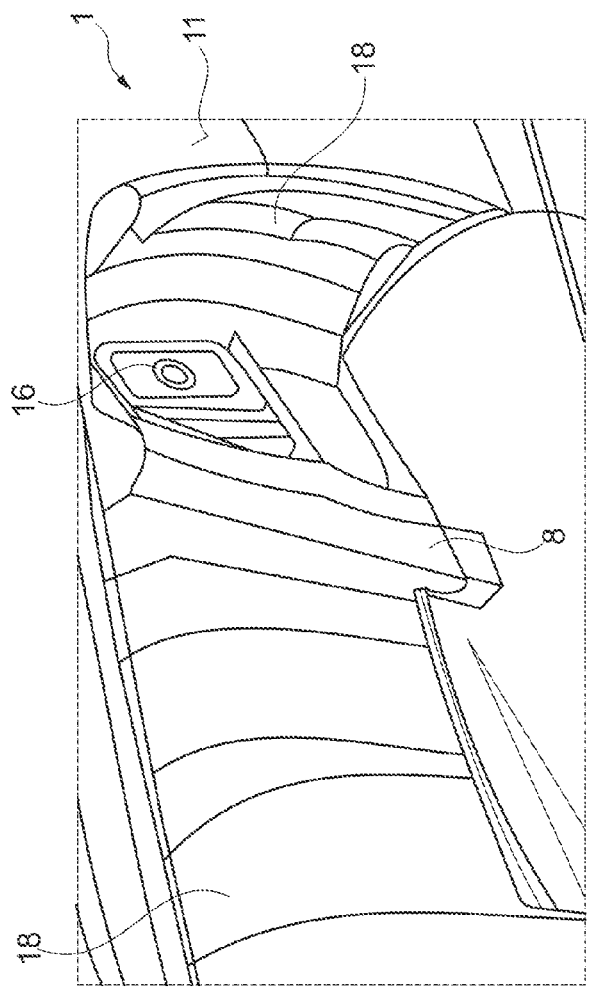

VEHICLE LAMP WITH LIGHT-EMITTING DIODE AS LIGHT SOURCE

CROSS-REFERENCE TO RELATED APPLICATION

This application claims priority to German Patent Application No. 10 2011 118 330.6, filed Nov. 11, 2011, which is incorporated herein by reference in its entirety.

TECHNICAL FIELD

The present disclosure relates to a vehicle lamp having a housing and an illumination unit arranged within the housing. The illumination unit comprises at least one light-emitting diode as light source. The at least one light-emitting diode is thermally coupled to a cooling element.

BACKGROUND

From the publication DE 10 2008 061 526 A1 a vehicle headlamp having a housing and an illumination unit arranged within the housing is known, wherein the illumination unit comprises at least one LED light source. The at least one LED light source is thermally coupled to a cooling element, wherein the cooling element comprises at least one heat sink arranged outside the housing. The heat sink is thermally coupled via a carrier element with the at least one LED light source arranged within the housing, wherein the cooling element with the at least one LED light source is movably mounted.

With the known vehicle lamp in the form of a vehicle headlamp, the cooling element that is thermally coupled to a heat sink arranged outside the housing and an LED light source for the low-beam light with a corresponding reflector unit are provided on the carrier element, and an LED light source are provided for the high-beam light with a corresponding optical unit arranged in front. During the heat discharge, the carrier element, which carries the two LED's, forms a thermal resistance which impairs the heat discharge from the LED's. Here, the heat-conducting carrier element is configured such that its surfaces are not visible through a transparent headlamp covering.

Accordingly, it may be desirable to improve the cooling action of the cooling element and to utilize surface regions of the cooling element which are noticeable from the outside through a transparent covering lens. In addition, other objects, desirable features and characteristics will become apparent from the subsequent summary and detailed description, and the appended claims, taken in conjunction with the accompanying drawings and this background.

SUMMARY

According to an exemplary embodiment of the present disclosure, a vehicle lamp having a housing and an illumination unit arranged within the housing is provided. The illumination unit comprises at least one light-emitting diode as light source. The at least one light-emitting diode is thermally coupled to a cooling element. The cooling element comprises a surface region arranged within the housing. On the surface region a decorative element is arranged.

An advantage that surface regions of the cooling element are now arranged directly within the housing on the one hand includes that the construction of the illumination unit can be significantly shortened and on the other hand in that the heat discharge into the heat sink is intensified since the thermal resistance of a carrier element is omitted. Thus, with this vehicle lamp a reduction of installation space is possible. In addition, through this measure, surface regions of the heat sink that are visible from the outside and surround the light-emitting diode or the optical unit of the heat sink are created, which can now be utilized for further functions. To this end, a decorative element is arranged on these surface regions that are visible from the outside. With this decorative element, new design elements are created in addition to the possibility of partially integrating the heat sink positioning in the housing. In addition, through the configuration of the visible surface regions of the heat sink, the direct view of an observer from the outside of the light sources in the form of dazzling LED's can be prevented. With the help of the decorative element, a sole position feature for this new vehicle lamp design is achieved in addition.

In another exemplary embodiment of the present disclosure it is provided to employ as vehicle lamp a full LED headlamp having at least one high beam LED and one low beam LED. The two LED's are arranged on a common cooling element. Through a transparent vehicle lamp covering lens, surface regions of the cooling element which surround the LED's are visible. On the surface regions are located decorative elements that are visible from the outside. Thus, not only the advantage of the improved thermal coupling of the light unit to the cooling element mentioned above is realized in such a full LED headlamp but the relatively large surface region of the cooling element, which surrounds the light-emitting diodes, shows a prominent sole position feature on the basis of the decorative element.

In addition it is possible that the vehicle lamp forms an LED rear lamp, which comprises a transparent covering region of a covering lens through which the surface region of the cooling element with decorative element is visible. In principle, any illumination device of a vehicle which is equipped with a light-emitting diode and comprises a transparent covering lens can thus be equipped with a decorative element on surface regions of a cooling element for the light-emitting diodes. In addition, it is advantageous when as transparent vehicle lamp covering lens a clear glass lens is provided. Such clear glass lenses have the advantage of a high thermal stability which cannot be impaired in their transparency even by high temperatures of a high-performance LED. With suitably intensive cooling through the heat sink it is however also possible that a plastic lens can be employed as transparent covering lens.

In another exemplary embodiment of the present disclosure it is provided that the cooling element comprises a heat sink with cooling ribs, which are arranged on a surface of the heat sink located opposite the visible surface region. Here, the heat sink can be configured in such a manner that the cooling ribs of the heat sink are arranged outside the housing. This is connected with the advantage that on the one hand the housing can be sealed off in a media-tight manner while an intensive cooling of the LED's via the cooling ribs arranged outside the housing nevertheless becomes possible.

It is provided, in another exemplary embodiment, that the cooling element comprises a heat sink of an aluminum alloy. The aluminum alloy can comprise a materially-joined connection with a decorative element. The materially-joined connection can be carried out through an adhesive layer or an adhesive foil. In addition, heat radiation via the visible surface regions of the cooling element, which are arranged in the headlamp housing, can be advantageously reduced so as not to heat up the interior of the housing. To this end it is advantageous when as materially-joined connection a heat-insulating adhesive foil is employed, which ensures that the surface regions of the heat sink which are arranged in the housing do not heat up the interior of the housing.

It is provided in addition that the decorative element comprises a lettering. This lettering can be attached to the decorative element in relief or stamped or engraved into the decorative element. In addition, the decorative element can be designed as emblem, which comprises a stamped-in or printed-on logo. Here it is provided that the decorative element covers the surface region of the cooling element in a completely lined manner, supporting the heat discharge via the cooling ribs with suitable thermal insulation action.

In another exemplary embodiment of the present disclosure, a metal plate is employed as a decorative element, wherein the metal plate can comprise a copper alloy with a chrome coating. Through the chrome coating, the copper plate or the copper alloy is protected from oxidation and is in a shiny metallic coating. On the other hand it is also possible to produce the decorative element from a plastic plate, wherein this plastic plate further improves the abovementioned heat insulation of the visible surface regions.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 4 shows a frontal view of the vehicle lamp according to FIG. 1;

FIG. 5 shows a view of a reflector unit for a low-beam headlamp with LED; and

FIG. 6 shows a top view of a lettering in the region of the decorative element.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
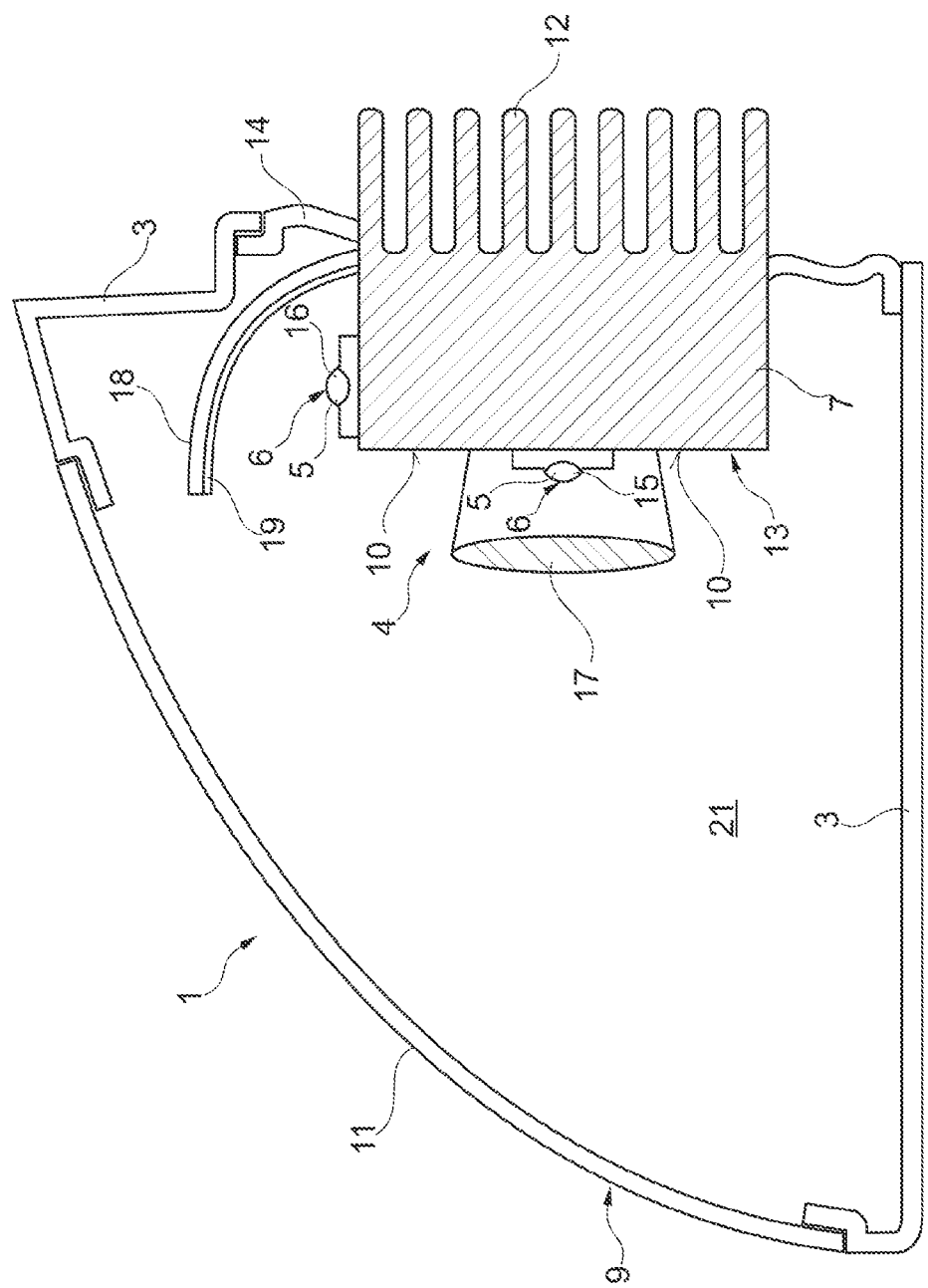
FIG. 1 shows a schematic cross section through a vehicle lamp according to an exemplary embodiment.

FIG. 1 shows a schematic cross section through a vehicle lamp 1, having a housing 3, which is closed on the front by a covering lens 11. In the housing 3, an illumination unit 4 is arranged which comprises two light-emitting diodes 5 as light sources 6. Both light-emitting diodes 5 are jointly arranged on a cooling element 7, which at least partially projects into the housing 3. Here, the cooling element 7 forms surface regions 10 which are visible through the covering lens 11 or round the light-emitting diodes 5.

These surface regions 10 of the cooling element 7 can comprise a lettering 13, which is decoratively visible from the outside through the covering lens 11 and can constitute a sole position feature for this type of a full LED headlamp 9. Here, the lettering 13 can be applied on the surface region 10 in relief or stamped, etched or engraved into the surface region 10. In addition to this, the lettering 13 can also be printed on and/or provided with a color background.

Through the special arrangement of the light-emitting diodes 5 on the cooling element 7, which partially projects into the housing 3, the thermal coupling of the light-emitting diodes 5 to the cooling element is intensified. The cooling action of the cooling ribs 12, which are arranged on the outside, increases the discharge of the lost heat of the high-performance light-emitting diodes. In addition it is possible to pivot the cooling element 7 from the outside and thus change the headlamp position. To this end, the cooling element 7, as is shown in FIG. 1, is arranged in a flexible rear wall region 14 of the vehicle lamp 1, which here is designed as Full LED headlamp 9. Through the flexible rear wall region 14 it is possible to pivot the illumination unit 4 in different directions in order to optimally illuminate a road.

Here, the surface region 10 with the lettering 13 is also pivoted at the same time and can thus be viewed from different angles. The two light-emitting diodes 5 are arranged on different surfaces of the cooling element 7, wherein a first light-emitting diode 15 interacts with an optical unit 17 in order to make possible a high beam light and the second light-emitting diode 16 interacts with a reflector unit 18 in order to realize a low-beam light. The reflector unit 18 to this end is curved and comprises a light-reflective coating 19.

Figure 2:
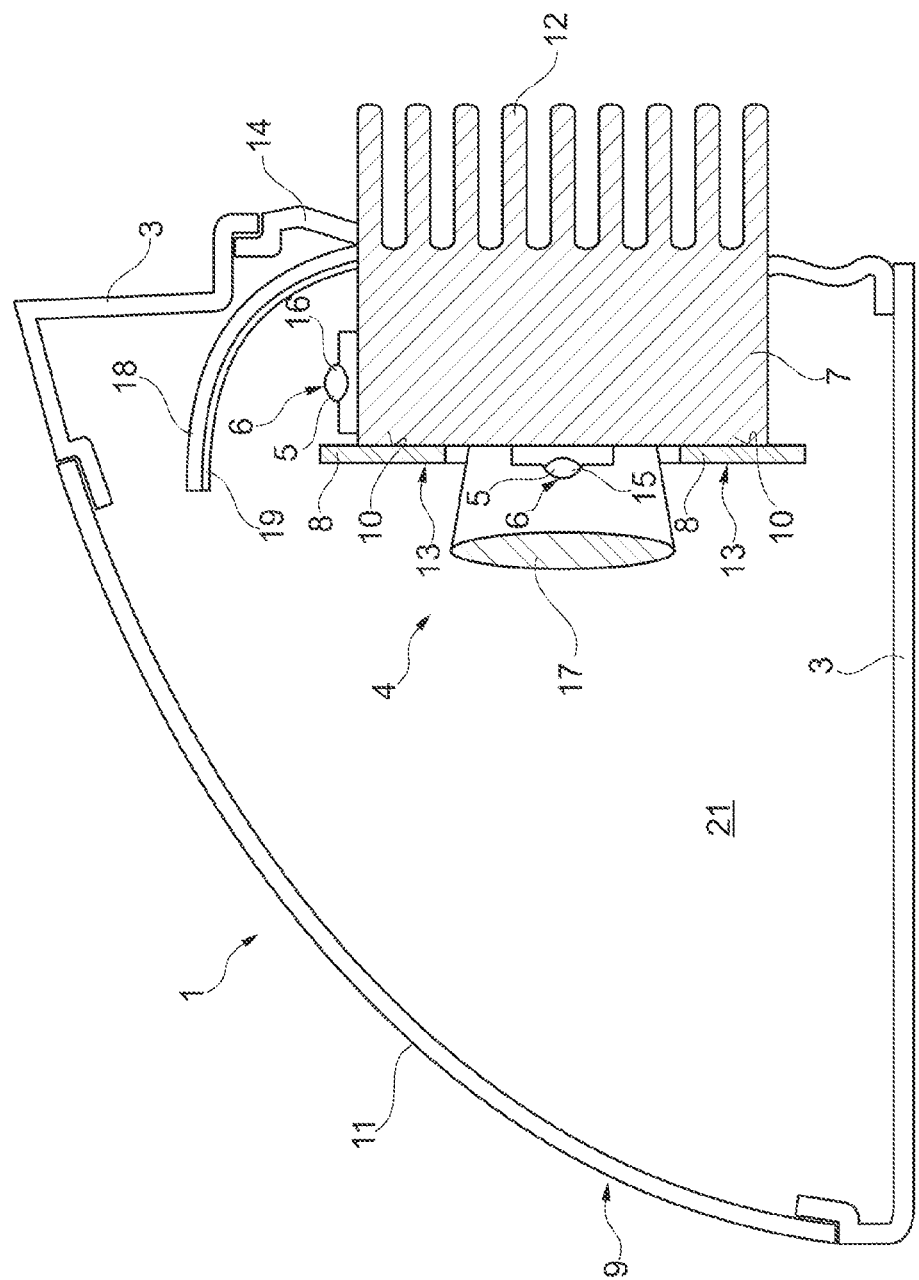
FIG. 2 shows a schematic cross section through the vehicle lamp according to FIG. 1.

FIG. 2 shows a schematic cross section through the vehicle lamp 1 according to FIG. 1, wherein components with same functions as in FIG. 1 are marked with same reference characters and need not be separately discussed. The difference to FIG. 1 comprises that on the surface region 10 of the cooling element 7 visible from the outside a decorative element 8 is applied. This decorative element 8 can comprise a plate which is screwed onto the visible surface region 10 of the cooling element 7 or is connected to the visible surface region 10 of the cooling element 7 through material joining. As is shown in FIG. 2, such a plate can also protrude over the visible surface region 10 and cover the light-emitting diode 16 in such a manner that it is not visible through the covering lens 11 from the outside.

The decorative element 8 in turn can carry a lettering 13 that is introduced into the decorative plate 8 either in relief or impressed. In addition it is possible to print or glue emblems onto the decorative element 8.

Figure 3:
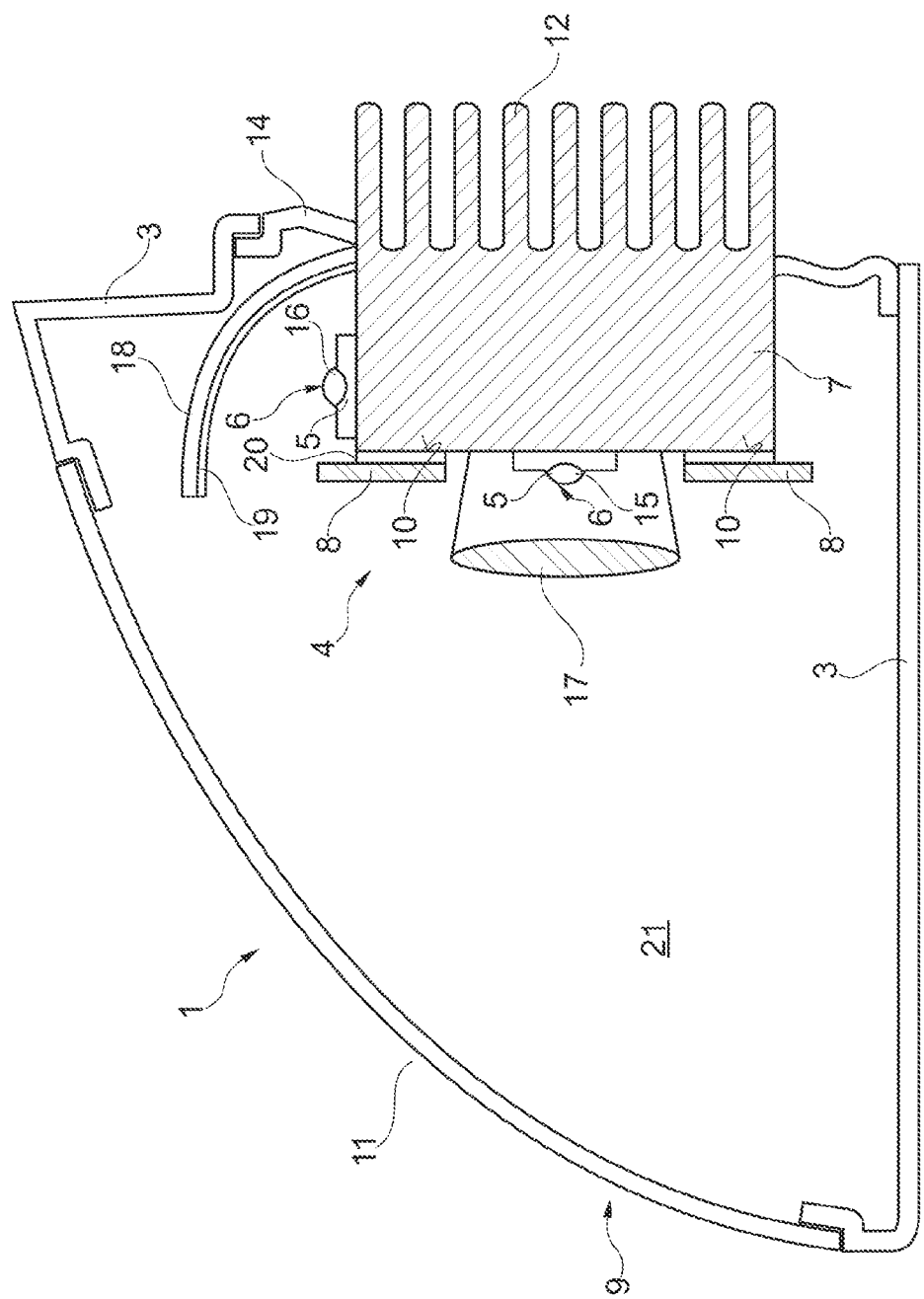
FIG. 3 shows a schematic cross section through the vehicle lamp according to FIG. 1.

FIG. 3 shows a schematic cross section through the vehicle lamp 1 according to FIG. 1, wherein on the visible surface region 10 of the cooling element 7 initially a thermal insulation layer or a thermal insulation foil 20 is applied, which substantially prevents these surface regions 10 from radiating heat into the interior 21 of the housing 3 and ensures that the lost heat of the light-emitting diodes 5 is substantially discharged via the cooling ribs 12 arranged outside the housing 3. In this case, the decorative element 3 can also comprise a plastic plate which is thermally decoupled from the cooling element 7 through the insulation foil 20 and thus remains dimensionally stable since it is not thermally overloaded.

FIG. 4 shows a front view of the vehicle lamp 1 according to FIG. 1. This front view is part of the vehicle 2, wherein the front view of this full LED headlamp 9 is surrounded by an engine hood 22, a fender 23 and a bumper 24. In addition to the two high-energetic light-emitting diodes 5, which are employed for the high-beam headlamp 25 and for the low-beam light, as was shown by the preceding Figures, a multiplicity of less powerful diodes are arranged as a light lamp 26. Between the daylight lamp 26, which in this case is arranged U-shaped, and the optical unit 17 of the high-beam headlamp 25, the hatched surface region 10 visible through the covering lens 11 is visible, on which the decorative element 8 is arranged.

An exemplary lettering 13 is shown in FIG. 5, which can be arranged on the decorative element 8 as is shown by FIG. 4.

Furthermore, FIG. 6 shows a black-white illustration of the reflector unit 18, which is visible spatially curved through the covering lens 11 of the headlamp. In addition, FIG. 6 shows a decorative element 8 which partially covers the visible surface region of the cooling element of the light-emitting diode 16 and thus lines the visible surface region of the cooling element.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A vehicle lamp, comprising:
    a housing;
    an illumination unit arranged within the housing;
    at least one light-emitting diode as light source of the illumination unit;
    a cooling element with which the light-emitting diode is thermally coupled, the cooling element including a surface region arranged within the housing; and
    a decorative element arranged on the surface region, wherein the decorative element includes a plate disposed over at least a portion of the surface region of the cooling element, the plate including an emblem, logo, or lettering.

2. The vehicle lamp according to claim 1, wherein the vehicle lamp is a full LED headlamp with at least one high-beam LED and with at least one low-beam LED, and wherein the at least one high-beam LED and at least one low-beam LED are arranged on a common cooling element, and wherein the at least one high-beam LED and at least one low-beam LED are surrounded by the surface region of the cooling element with the decorative element that is visible through a transparent vehicle lamp covering lens.

3. The vehicle lamp according to claim 1, wherein the vehicle lamp is a rear lamp with at least one LED, and wherein the rear lamp comprises a transparent covering region of a covering lens through which the surface region of the cooling element with decorative element is visible.

4. The vehicle lamp according to claim 3, wherein the transparent covering region includes a clear glass lens.

5. The vehicle lamp according to claim 3, wherein the transparent covering region includes a plastic lens.

6. The vehicle lamp according to claim 1, wherein the cooling element comprises a heat sink with cooling ribs, and the cooling ribs are arranged on a surface of the heat sink that is located on the surface region.

7. The vehicle lamp according to claim 1, wherein the cooling element further comprises a heat sink of an aluminum alloy, and the decorative element is connected in a materially joined manner to the surface region of the aluminum alloy of the heat sink.

8. The vehicle lamp according to claim 1, wherein the decorative element comprises a lettering.

9. The vehicle lamp according to claim 8, wherein the lettering is arranged in relief on the decorative element.

10. The vehicle lamp according to claim 8, wherein the lettering is stamped or engraved into the decorative element.

11. The vehicle lamp according to claim 1, wherein the decorative element comprises an emblem with stamped-in or printed on logo.

12. The vehicle lamp according to claim 1, wherein the decorative element covers the surface region of the cooling element in a completely lined manner.

13. The vehicle lamp according to claim 1, wherein the decorative element comprises a metal plate.

14. The vehicle lamp according to claim 13, wherein the metal plate comprises a copper alloy and a chrome coating.

15. The vehicle lamp according to claim 1, wherein the decorative element comprises a plastic plate.

16. A motor vehicle, comprising:
    a vehicle lamp including a housing, with an illumination unit arranged within the housing, at least one light-emitting diode as light source of the illumination unit and a cooling element with which the light-emitting diode is thermally coupled, the cooling element having a surface region arranged within the housing on which a decorative element is arranged,
    wherein the decorative element includes a plate disposed over at least a portion of the surface region of the cooling element the plate including an emblem, logo, or lettering, and
    wherein the cooling element includes a heat sink with cooling ribs, and the cooling ribs are arranged on the surface region.

17. The vehicle lamp according to claim 16, wherein the heat sink is composed of an aluminum alloy, and the decorative element is connected in a materially joined manner to the surface region of the aluminum alloy of the heat sink.

18. The vehicle lamp according to claim 16, wherein the decorative element comprises a lettering.

19. The vehicle lamp according to claim 18, wherein the lettering is arranged in relief on the decorative element.

20. The vehicle lamp according to claim 18, wherein the lettering is stamped or engraved depressed into the decorative element.

* * * * *